US012522234B2

United States Patent
Aksyutina et al.

(10) Patent No.: US 12,522,234 B2
(45) Date of Patent: *Jan. 13, 2026

(54) AUTOMATED EXECUTION OF VEHICLE FUNCTIONS

(71) Applicant: Ford Global Technologies, LLC, Dearborn, MI (US)

(72) Inventors: Yuliya Aksyutina, Jülich (DE); Stephen John Cook, Hockley (GB); Roman Atilla Koch, Aachen/Nordrhein-Westfalen (DE); Cem Mengi, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

This patent is subject to a terminal disclaimer.

(21) Appl. No.: 18/052,587

(22) Filed: Nov. 4, 2022

(65) Prior Publication Data

US 2023/0202498 A1   Jun. 29, 2023

(30) Foreign Application Priority Data

Sep. 6, 2021  (DE) .......................... 102021123028.4

(51) Int. Cl.
*B60W 50/10*   (2012.01)

(52) U.S. Cl.
CPC .......... *B60W 50/10* (2013.01); *B60W 2520/10* (2013.01); *B60W 2540/16* (2013.01);
(Continued)

(58) Field of Classification Search
CPC ............. B60W 50/10; B60W 2556/45; B60W 2555/60; B60W 2520/10; B60W 2540/16; B60W 2540/18
See application file for complete search history.

(56) References Cited

U.S. PATENT DOCUMENTS 11,618,398 B2 *  4/2023  Carlhoff .............. B60R 16/0373
                                                          701/48
11,738,766 B2 *  8/2023  Carlhoff .................. H04L 12/40
                                                          701/1
(Continued)

FOREIGN PATENT DOCUMENTS

CN         103761462 A     4/2014
DE      102014224124 A1     6/2016
(Continued)

OTHER PUBLICATIONS

DE Search Report dated Mar. 5, 2022 (Non-English).

*Primary Examiner* — Peter D Nolan
*Assistant Examiner* — Wae L Louie
(74) *Attorney, Agent, or Firm* — Emily Drake; Brooks Kushman P.C.

(57) ABSTRACT

A computer-implemented method for the automated execution of vehicle functions of a vehicle includes: providing a vehicle function processing sequence which specifies a processing sequence of vehicle functions on the occurrence of a first triggering event, wherein the first triggering event is based on communication from a communication-enabled infrastructure device; checking for the occurrence of the first triggering event; on the occurrence of the first triggering event, generating control signals for controlling vehicle function devices in accordance with the vehicle function processing sequence; and outputting the generated control signals to the vehicle function devices executing the vehicle functions. In addition, a system for the automated execution of vehicle functions of a vehicle is provided.

14 Claims, 3 Drawing Sheets

(52) U.S. Cl.
CPC ..... *B60W 2540/18* (2013.01); *B60W 2555/60* (2020.02); *B60W 2556/45* (2020.02)

(56) References Cited

U.S. PATENT DOCUMENTS

| | | |
|---|---|---|
| 2014/0316609 A1 | 10/2014 | Washington et al. |
| 2015/0203062 A1* | 7/2015 | Gautama ............... B60R 16/037 |
| | | 701/49 |
| 2018/0082142 A1* | 3/2018 | Han ......................... H04N 5/77 |
| 2019/0299929 A1* | 10/2019 | Neuhoff .................. B60R 25/24 |
| 2020/0317078 A1* | 10/2020 | Zhang ..................... G08G 1/149 |
| 2021/0309235 A1* | 10/2021 | Carlhoff ................ B60W 50/14 |
| 2021/0309245 A1* | 10/2021 | Carlhoff .............. B60W 50/085 |
| 2023/0182684 A1* | 6/2023 | Mengi ..................... B60R 16/02 |
| 2023/0202498 A1* | 6/2023 | Aksyutina ............... G05D 1/021 |
| | | 701/36 |
| 2023/0252613 A1* | 8/2023 | Aslandere ................. G06T 5/50 |
| | | 382/100 |
| 2024/0298114 A1* | 9/2024 | Aslandere ................ H04R 3/12 |

FOREIGN PATENT DOCUMENTS

| | | |
|---|---|---|
| DE | 102018207300 A1 | 11/2019 |
| DE | 102020109360 A1 | 10/2021 |
| EP | 3569464 A1 | 11/2019 |
| WO | 2013174788 A1 | 11/2013 |

* cited by examiner

AUTOMATED EXECUTION OF VEHICLE FUNCTIONS

CROSS-REFERENCE TO RELATED APPLICATION

This patent application claims priority to German Application No. DE 102021123028.4 filed on Sep. 6, 2021, which is hereby incorporated by reference in its entirety.

BACKGROUND

The present disclosure relates to a computer-implemented method and a system for the automated execution of vehicle functions of a vehicle. The invention also relates to a computer program and a computer-readable medium.

Many driving situations require the driver or another user of a vehicle to repeatedly activate and/or deactivate certain vehicle functions. An example of this is a delivery or parcel driver who must activate or deactivate multiple vehicle functions, sometimes in a specific order, when stopping the vehicle to deliver a parcel. These may include, for example: switching off the vehicle engine, closing the windows, selecting the "Park" gear shift position, switching off the ignition, opening and closing doors, locking the vehicle, activating and deactivating the hazard warning lights, activating the navigation system in order to determine the next delivery location, etc. Considered over an entire working day, it may be necessary to repeat these activities more than a hundred times.

As the number of vehicle functions generally increases, methods and systems have been and are being developed that allow a plurality of vehicle functions to be activated or deactivated automatically in specific situations. For example, it is possible to automatically close/open windows, switch the hazard warning lights on and off, lock and unlock the vehicle, switch the ignition on and off, keep certain functions or actuators on standby after the vehicle has been switched off, etc. Ultimately, almost every vehicle function can be automated.

In the as yet unpublished German patent application with the filing number 10 2020 109 360.8, filed on 3 Apr. 2020, examples of how such automation can be implemented in the form of vehicle function processing sequences are described.

Such automation is usually aimed at reducing the number of manual steps for the driver to save time and reduce cognitive overload. To trigger a corresponding vehicle function processing sequence, a simple, repetitive detectable action is normally required as a triggering event, also called a trigger. For example, if automation is required when parking the vehicle, a suitable triggering event is an action that the driver performs anyway during a typical parking operation. Examples of such actions include selecting park mode, or pressing the engine start button.

The prior art contains the examples of automation systems of vehicle functions, described briefly below.

Document CN 1 03 761 462 A discloses a method for personalizing vehicle settings, in which the adjustment of the seat position setting and the rear view mirror are linked to the driver's voice and stored. When the driver's voice is detected as a triggering event, the corresponding adjustments are applied automatically, so that manual adjustment is not necessary. However, this procedure is limited to a specific vehicle and vehicle functions which should only be adjusted depending on the detected driver. It is not possible to adjust vehicle functions based on events outside the vehicle and events that affect the driving process.

Document WO 2013/174 788 A1 describes a device for the event-driven automatic activation and/or deactivation and/or adjustment of at least one vehicle function system, e.g., a seat heater, a radio, etc. The device has an operating interface that allows the vehicle user to specify a rule that includes at least one condition for a selectable input variable and which relates a selectable vehicle function system to the selectable input variable. This enables an automated vehicle function to be executed on the basis of the rules that can be specified by the vehicle user. Optionally, a sequence of vehicle functions can also be associated to one rule. For example, the GPS position of the vehicle in conjunction with the vehicle speed can be used as input variables.

Document US 2015/0 203 062 A1 discloses methods and systems for creating user profiles for a vehicle and a method for managing such a user profile. In these, data is generated to display a selection screen of a graphical user interface in the vehicle. Profile personalization data is then received and a user profile is generated from this data and then stored. The user can also be identified.

Document EP 3 569 464 A1 describes a method that temporarily modifies a vehicle feature depending on an emotional state of the vehicle user. There is no provision for permanent definition of vehicle function processing sequences actively by the vehicle user.

Document US 2014/0 316 609 A1 discloses a system and methods for adapting vehicle systems based on the vehicle position. In particular, a window position of the vehicle can be specified depending on the vehicle location. For example, the window can be opened or closed depending on the vehicle location. In addition to the vehicle position, the vehicle speed, the activation of a windscreen wiper and the brake pedal position can be used as input signals to decide whether to open or close the window.

SUMMARY

However, there are driving situations in which a vehicle function is triggered but the activation of a specific vehicle function processing sequence may be undesirable. For example, some drivers select Park mode while waiting at a red light or other situations. If an automated parking procedure is initiated when the vehicle is switched to Park mode, this may be unwanted, as the driver only wishes to stop the vehicle for a short time but does not want to park the vehicle.

In addition, in certain situations, the driver may want to activate the automation at varying levels. For example, if the driver parks their vehicle on the road, they may want to activate the hazard warning lights. However, if the vehicle is parked in a garage or in a company car park, the hazard warning lights should not be switched on automatically, in order to save the driver a manual action, i.e., switching off the hazard warning lights.

The automation of vehicle functions can also help to reduce the number of operating cycles of vehicle components in order to increase their service life. However, it is not always easy to identify situations in which specific actuators should remain in a specific state. This may be desirable to avoid unnecessary actions. For example, a high-voltage protection device can remain connected if only a brief shutdown of the vehicle is intended.

In addition, it may be desirable to leave an actuator in a specific state for the driver. For example, the vehicle function processing sequence can remain activated for some time after the shutdown. At the same time, however, all unnecessary systems should be switched off as soon as possible after the vehicle has been switched off, in order to maintain the battery's charge state.

Accordingly, one aspect of the present disclosure is to specify ways in which the automation of vehicle functions can be further increased. For example, it would be desirable to avoid an unwanted triggering of a vehicle function processing sequence and/or to allow an automatic adaptation of a vehicle function processing sequence based on a driving situation. It would also be desirable to require as few actions as possible to be performed by the driver to activate a vehicle function processing sequence.

One or more implementations of the present disclosure relates to a computer-implemented method for the automated execution of vehicle functions of a vehicle. The method includes the following: providing a vehicle function processing sequence which specifies a sequence of vehicle functions to be processed on the occurrence of a first triggering event, wherein the first triggering event is based on communication from a communication-enabled infrastructure device, checking for the occurrence of the first triggering event, generating control signals for controlling vehicle function devices on the occurrence of the first triggering event in accordance with the vehicle function processing sequence, and outputting the generated control signals to the vehicle function devices for executing the vehicle functions.

Computer-implemented means that at least one method step, preferably a plurality or all of the method steps, are executed using a computer program having processor-executable instructions stored in a memory and executed by a processor of the computer.

A vehicle can be understood to mean any mobile means of transport, i.e., both a terrestrial vehicle and a water-borne vehicle or aircraft, for example a passenger car or heavy goods vehicle.

Vehicle functions can be understood as functions that the vehicle can perform autonomously, i.e., without the intervention of the driver or a vehicle user, such as opening/closing of vehicle openings such as doors, windows, sliding roofs, etc., switching the ignition on/off, unlocking/locking the vehicle, switching the air conditioning system on/off, decreasing/increasing the sound volume and/or changing other settings of an infotainment system, selecting a specific gear shift position, setting a specific seat position, switching a lighting system on/off, displaying certain contents in a display device, transmitting specifiable data to a computer cloud, etc. The vehicle functions are carried out by corresponding vehicle function devices based on control signals that are output to the vehicle function devices.

A vehicle function processing sequence defines a chronological sequence in which one or more vehicle functions are carried out. In other words, a chronological sequence is defined wherein some vehicle functions can be executed in parallel, temporally offset, or sequentially. In addition to a chronological sequence, a vehicle function processing sequence can also contain conditions, loops, and user-defined sub-programs. The vehicle function processing sequence can be defined by a user, who can be, for example, a vehicle driver, a vehicle owner, a service engineer, a fleet manager, or some other authorized person.

At least one triggering event is associated with each vehicle function processing sequence and the assigned sequence is initiated when this event occurs. A triggering event can also be associated with more than one vehicle function processing sequence and can thus initiate the processing of multiple vehicle function processing sequences.

At least one triggering event, referred to here as the first triggering event, is based on communication from a communication-enabled infrastructure device. The term "first" triggering event does not necessarily refer to a chronological sequence. If a plurality of triggering events are taken into account, referred to here as "first triggering event" and "further triggering events", the first triggering event can therefore occur and be taken into account prior to, in parallel with, or following one or more triggering events. The term "first triggering event" is intended only to differentiate it from further triggering events in the sense that at least the first triggering event is based on a communication from a communication-enabled infrastructure device and at least one such first triggering event is taken into account as part of the proposed method.

The term "infrastructure device" refers to a public or private installation intended to provide services of public interest and/or economic development. Preferably, the infrastructure device is a vehicle-external technical infrastructure device, in particular a traffic infrastructure device, such as a set of traffic lights, a traffic sign, a railway crossing, a vehicle charging station, a vehicle parking facility, etc. The infrastructure device may preferably be located in the vehicle environment, and preferably in the immediate environment of the vehicle, e.g., within a radius of 5 m to 500 m around the vehicle.

According to the present disclosure, the infrastructure device is designed to be capable of communication, i.e., the infrastructure device can at least send data, and optionally send and receive data. For this purpose, the infrastructure device has at least one transmitting device, optionally a transmitting and receiving device. In particular, it may be possible to establish an active signal-communication connection to the vehicle, i.e., the infrastructure device may be connected to the vehicle for data transmission. The signal-based active connection can be designed as a direct or indirect mobile radio connection, e.g., via a computer cloud. For example, communication between the infrastructure device and the vehicle can be carried out using Bluetooth®. Direct communication between the vehicle and the infrastructure device can be carried out, for example, by V2I (Vehicle-to-Infrastructure) communication.

The design of the infrastructure device as a communication-enabled infrastructure device advantageously enables communication between the vehicle and the infrastructure device, so that data regarding the respective locations and/or other data, such as a status, can be transferred.

By basing the first triggering event on a communication from the communication-enabled infrastructure device, the occurrence of the first triggering event can be checked more reliably, since for the localization of infrastructure devices, for example, it is not necessary to access databases—which may be no longer up-to-date—but instead the infrastructure device can be detected directly on the basis of its communication.

In addition, not only can the mere presence of the infrastructure device be communicated, but it is also possible to transmit additional data and/or information. For example, a specific state of the infrastructure device can be communicated. Examples include whether the traffic light system is showing red or green, whether a barrier at the railway crossing is open or closed, etc. This offers the possibility of specifying triggering events in more detail, i.e., it is not only possible to check whether a set of traffic lights is present, but also whether it is showing red or green. The color indicated can then be used as a triggering event for different vehicle function processing sequences.

Optionally, the first triggering event can also be the absence of a communication-enabled infrastructure device in the vicinity of the vehicle. For example, it may be possible to provide regular communication with a communication-enabled infrastructure device and to consider an interruption of this communication as the first triggering event.

To check for the occurrence of the first and possible further triggering events, one or more input variables can be monitored, e.g., vehicle speed, time, temperature, air humidity, etc. For this purpose, appropriately designed sensors can be used. These input variables can preferably be user-independent, i.e., their value is not directly influenced by the user of the vehicle. It therefore becomes possible to execute the vehicle function processing sequences completely automatically. It may also be possible to provide input variables in a user-dependent form, e.g., a position of a button or switch that can be operated by the user.

In a simple implementation, an input value of an input variable may be determined and compared with a threshold value. For example, the current outside temperature can be measured and compared with a maximum or minimum temperature. If the threshold value is reached, exceeded or undershot, this constitutes the occurrence of the triggering event and the vehicle function processing sequence associated with the triggering event is executed provided further conditions, e.g., the occurrence of another triggering event, are met.

A controller can be used to check for the occurrence of the first and possibly further triggering events. Similarly, if the triggering event or events occur, the controller can generate control signals according to one or more vehicle function processing sequences and output them to the corresponding vehicle function devices for executing the vehicle functions.

In accordance with different implementations, a vehicle function processing sequence can be provided that specifies a processing of vehicle functions when the first triggering event and at least one further triggering event occurs. In this case, the method comprises checking for the occurrence of the at least one further triggering event, wherein the control signals are generated if the first triggering event and the at least one further triggering event occur.

The control signals generated are then output to the vehicle function devices for executing the vehicle functions.

In an implementation, the at least one further triggering event may be independent of the first triggering event. All triggering events to be taken into account are also preferably independent of each other.

The at least one further triggering event can be, for example:
- the activation of a screen element of a human-machine interface,
- the occurrence of a specific environmental condition, e.g. ambient temperature, rain, sunshine, etc.,
- the expiry of a specific period of time, reaching a certain point in time (time of day and/or date),
- the detection of a specific vehicle characteristic, e.g. vehicle speed, battery charge state, ignition state, opening or closing a vehicle opening, e.g. a vehicle door or trunk flap,
- the detection of a specific road or a specific road characteristic, e.g. a freeway, off-road driving, low road adhesion,
- communication with a connected mobile terminal, such as a smartphone or tablet, such as an incoming message or an application notification, one of the above possibilities for the first triggering event, but different from the specific first triggering event.

In addition, like the first triggering event, one or more further triggering events can be based on a communication from a communication-enabled infrastructure device.

By providing at least two triggering events, a particular situation can be more reliably identified in comparison to the use of a single triggering event. This can prevent an unwanted activation of a vehicle function processing sequence.

In addition, considering a plurality of triggering events allows the situation to be defined more precisely, so that a different level of automation can be activated and/or certain actuators can remain in a specific state depending on the situation, so that the service life of vehicle components can be increased and/or driver usability can be increased.

If a plurality of triggering events are taken into account, i.e., the first triggering event and one or more further triggering events, the method can either specify that the chronological order of occurrence of the triggering events is important and therefore to be taken into account, or the method can specify that the chronological sequence of occurrence of the triggering events is not relevant, but will only check whether the triggering events are present, regardless of their chronological sequence.

It may also be provided that, for example, a software developer, driver or vehicle user can define which triggering events are relevant, whether the sequence is relevant and, optionally, in case the chronological sequence is relevant, in which order the triggering events must occur in order to trigger the processing of an associated vehicle function processing sequence.

According to further implementations, one of the triggering events, i.e., the first triggering event or one of the further triggering events, can be a position of the vehicle within a specifiable distance from the communication-enabled infrastructure device. Checking for the occurrence of this triggering event accordingly involves determining the position of the vehicle with respect to the communication-enabled infrastructure device.

In other words, one of the triggering events may be a minimum and/or maximum distance to be determined between the vehicle and the infrastructure device.

The term "position" refers here to the geographical position. As an option, the term "position" can also include the orientation of the vehicle, for example with respect to the infrastructure device.

The position of the vehicle with respect to the communication-enabled infrastructure device can be determined by a global navigation satellite system, e.g. NAVSTAR, GPS, GLONASS, Galileo, Beidou, etc., and/or by direct communication between the vehicle and the communication-enabled infrastructure device.

The position of the vehicle within a specifiable distance range of the communication-enabled infrastructure is a very useful triggering event in many situations, because it can be used to establish a spatial relationship between the vehicle and the communication device. Such a triggering event can be used for a wide range of conceivable vehicle function processing sequences linked to a specific position of the vehicle.

If the position of the vehicle in the specifiable distance range is determined by direct communication between the vehicle and the communication-enabled infrastructure device, the occurrence of the triggering event can be checked with particularly high reliability.

According to further implementations, one of the triggering events can be a specifiable state of the communication-enabled infrastructure device.

Examples include the color signaled by a traffic light system, e.g., red or green, the barrier position of a railway crossing, e.g., open or closed, the occupancy density of a vehicle parking facility, expected waiting time before using the infrastructure device, etc.

Preferably, the checking for the presence of the specifiable state of the communication-enabled infrastructure device as a triggering event can be based on a communication from the communication-enabled infrastructure device, preferably a direct communication between the infrastructure device and the vehicle.

Alternatively or additionally, the presence of the specifiable state of the communication-enabled infrastructure device as a triggering event can be checked by a sensor device on the vehicle, e.g., by observing the infrastructure device using a vehicle camera and appropriately evaluating the camera images.

Taking into account the state of the infrastructure device allows further differentiation and thus increased assessment of the current situation of the vehicle. Vehicle function processing sequences can therefore be activated more precisely and, if applicable, activated to a different extent according to the needs of the driver. Unwanted activation of vehicle function processing sequences can be avoided to a large extent.

According to further implementations, one of the triggering events can be a value of a vehicle-related parameter in a specifiable value range.

For example, the vehicle-related parameter can be selected from a group consisting of acceleration, speed, steering wheel angle change, and gear shift position. The acceleration can be positive or negative, i.e., it can describe a speed increase or decrease. Vehicle-related parameters can refer to the powertrain or the vehicle chassis, for example.

The consideration of one or more vehicle-related parameters may further increase the assessment of the current situation of the vehicle, so that vehicle function processing sequences to be executed can be selected in a more targeted way.

In accordance with further implementations, control signals can be generated to a different extent depending on the occurrence of one or more triggering events.

In other words, the extent to which a vehicle function processing sequence is used can be varied depending on which triggering signals have been detected. If, for example, the vehicle is found to be in front of its own vehicle parking facility instead of any vehicle parking facility, for example a garage, the automatic activation of the vehicle function "lock doors" can be omitted. In contrast, however, enabling this feature in a public garage is essential and should be executed automatically accordingly.

The possibility of variation in the extent to which vehicle functions are executed based on a vehicle function processing sequence can contribute to increasing driver usability of vehicle function processing sequences.

One or more implementation of the present disclosure relate to a system for the automated execution of vehicle functions of a vehicle. The system has elements such as a processor and memory storing instructions for carrying out one of the methods described above.

Consequently, reference can be made to the above explanation of the methods.

For example, the system can include a memory for storing one or more vehicle function processing sequences that specify the processing of vehicle functions upon the occurrence of a triggering event associated with the vehicle function processing sequence.

In addition, a communication unit, designed to communicate with a communication-enabled infrastructure device, may be present. For example, the communication unit may be designed to select one or more infrastructure devices and to receive and process infrastructure signals from the communication-enabled infrastructure device or transmit them to the controller for processing.

In addition, the system can optionally have a position determination unit that is designed to communicate with a global navigation satellite system. Such a position determination unit may be designed to receive positioning signals from the global navigation satellite system, to use the positioning signals to determine the position of the vehicle and, if necessary, to make position corrections to refine the determined position of the vehicle.

In addition, the system can have an input unit that can allow vehicle function processing sequences to be defined, adjusted, activated, deactivated, modified, etc. For example, the input unit can be designed to receive input signals from an infotainment screen, a mobile terminal, for example a smartphone, or appropriate controls, from a computer cloud, etc. The input unit can allow the driver of the vehicle or a vehicle user to modify stored vehicle function processing sequences, define triggering events, activate or deactivate vehicle function processing sequences, specify combinations of triggering events that cause triggering of a vehicle function processing sequence, etc.

Optionally, the system can have sensors for determining values of vehicle-related parameters.

In addition, the system can include a controller—for checking the occurrence of one or more triggering events, selecting a stored vehicle function processing sequence associated with the present triggering event, generating control signals to control vehicle function devices according to the selected vehicle function processing sequence, and outputting the generated control signals to the vehicle function devices.

The controller is responsible for executing one or more vehicle function processing sequences if the associated triggering event or events is/are present, generating the control signals associated with the vehicle function processing sequences and outputting them to the vehicle function devices.

In order to fulfill these functions, the controller has an active signal-communication connection to the memory, to the communication unit, to vehicle function devices, as well as, if present, the position determination unit, the input unit, and sensors for detecting a triggering event.

The controller can receive various signals, for example sensor signals, infrastructure signals, position determination signals, input signals, and process these signals based on instructions or a code programmed in the controller corresponding to one or more routines. The controller makes a decision as to whether one or more vehicle function processing sequences should be executed, not executed, or partially executed. The controller then generates control signals, if appropriate, and outputs these to the vehicle function devices as actuators in response to the processed signals.

The controller can be implemented in hardware and/or software and can be physically designed as a single-part or multi-part unit. The controller can be part of or integrated into an engine control unit and can be arranged in the vehicle. Alternatively, the controller can be arranged outside the vehicle, e.g., in a computer cloud.

The system as a whole, i.e., all elements of the system, may be arranged in the host vehicle. This advantageously allows autonomous use of the system for a particular vehicle, as communication between the individual elements is only necessary within the vehicle.

Alternatively, one or more or all elements of the system may be arranged outside the vehicle. This enables the use of the vehicle function processing sequences by multiple vehicles, for example. It is not necessary to equip the vehicles with the system; rather it is sufficient if the vehicles have a receiving device for receiving the generated control signals or if the vehicle function devices are appropriately designed.

The system of the present disclosure makes it possible to automate the processing of a plurality of vehicle functions that can be specified in the form of vehicle function processing sequences.

A computer program can be defined as a program code that can be stored on a suitable tangible medium and/or retrieved via a suitable medium. For storing the program code any suitable medium for storing software can be used, for example a non-volatile memory installed in a controller, a DVD, a USB stick, a flash card, or the like. The program code can be retrieved, for example, via the internet or an intranet or via another suitable wireless or wired network.

BRIEF DESCRIPTION OF THE DRAWINGS

The invention is explained in more detail below using the illustrations and the associated description.

DETAILED DESCRIPTION

Figure 1:
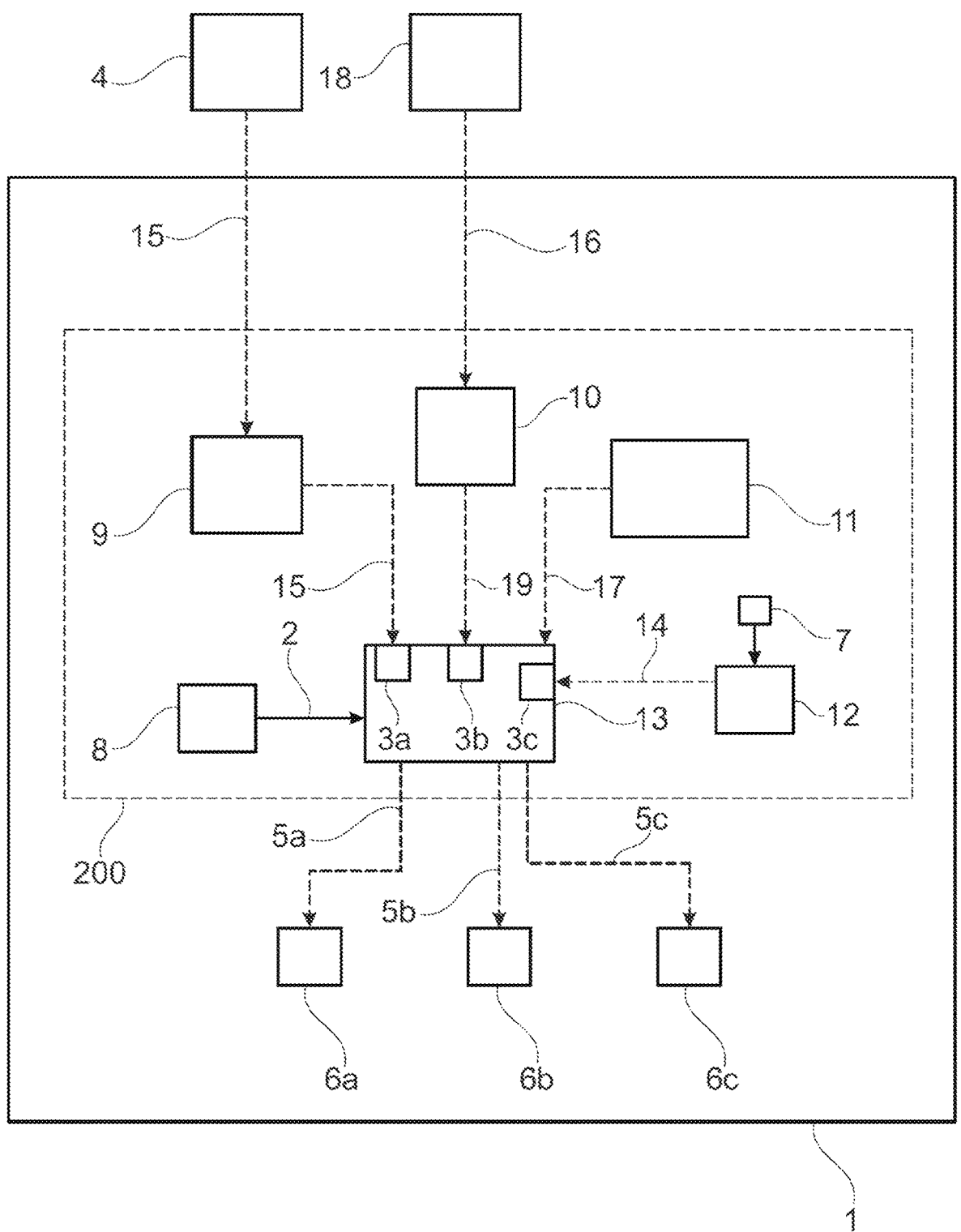
FIG. 1 shows a schematic illustration of an example system.

FIG. 1 shows an example system 200 for the automated execution of vehicle functions of a vehicle 1. The vehicle 1 can be designed, for example, as a passenger car or delivery vehicle and has a plurality of vehicle function devices 6a, 6b, 6c for executing vehicle functions. The system 200 can be arranged in the vehicle 1, as shown in FIG. 1. Alternatively, the system 200 can be located completely or partially outside the vehicle 1, so that control signals 5a, 5b, 5c are transmitted from outside to the vehicle function devices 6a, 6b, 6c belonging to the vehicle 1, for example by radio transmission.

The system 200 generally has elements that allow it to carry out a method 100, for example the method 100, which is explained below with reference to FIG. 2, for the automated execution of vehicle functions. These elements include a memory 8, a communication unit 9, a position determination unit 10, an input unit 11, a sensor 12, and a controller 13.

The memory 8 stores a plurality of vehicle function processing sequences 2, each of which specifies the processing of vehicle functions on the occurrence of at least a first triggering event 3, the first triggering event being based on a communication from a communication- enabled infrastructure device 4. Optionally, one or more vehicle function processing sequences 2 can be assigned a plurality of triggering events 3a, 3b, 3c that must occur in order for the corresponding vehicle function processing sequence 2 to be activated and the processing of vehicle functions defined therein to be executed. The memory 8 has an active signal-communication connection to the controller 13 or can be integrated into the controller 13, so that vehicle function processing sequences 2 can be retrieved from the memory 8 and transmitted to the controller 13. Such a transmission is shown in FIG. 1 by means of a solid arrow between the memory 8 and the controller 13, which is marked with the reference sign 2.

The controller 13 also has an active signal-communication connection to the communication unit 9. The communication unit 9 is used for communication with a communication-enabled infrastructure device 4, e.g., a traffic light system, i.e., the communication unit 9 can receive infrastructure signals 15 emitted by the communication-enabled infrastructure device 4 and transmit them to the controller 13 for further processing. For example, the infrastructure signals 15 can comprise data about the current state of the communication-enabled infrastructure device 4, so that, for example, it can be determined whether the traffic light is showing red or green.

Optionally, the communication unit 9 can also emit signals to the communication-enabled infrastructure device 4, enabling two-way communication between the system 200 and the communication-enabled infrastructure device 4. Such a two-way communication can be used, for example, to determine the position of the vehicle 1 with respect to the communication-enabled infrastructure device 4.

Furthermore, the controller 13 has an active signal-communication connection to the position determination unit 10. The position determination unit 10 is used to determine the position of the vehicle 1. For this purpose, the position determination unit 10 can receive position determination signals 16 from a global navigation satellite system 18 and transmit the determined position 19 to the controller 13.

The input unit 11 also has an active signal-communication connection to the controller 13. Using the input unit 11, a user of the vehicle 1 can enter inputs which are transmitted to the controller 13 in the form of input signals 17. In the example implementation, the input unit 11 is implemented as a touch-sensitive infotainment screen. For example, the input unit 11 can be used to modify vehicle function processing sequences 2.

At least one sensor 12 is also present which is used to determine parameter values of a vehicle-related parameter 7, e.g., the current speed of the vehicle 1. The determined parameter values can also be transmitted in the form of sensor signals 14 to the controller 13, which has an active signal-communication connection to the sensor 12.

The task of the controller 13 is to check on the basis of the received infrastructure signals 15, sensor signals 14 and the position 19, whether one or more triggering events 3a, 3b, 3c associated with one or more vehicle function processing sequences 2, provided by the memory 8, have occurred. If the required triggering signals 3a, 3b, 3c are present, the controller 13 generates control signals 5a, 5b, 5c in accordance with the relevant vehicle function processing sequences 2 and outputs them to the vehicle function devices 6a, 6b, 6c so that the corresponding vehicle functions are executed.

The control signals 5a, 5b, 5c can be output to the vehicle function devices 6a, 6b, 6c either directly or indirectly. In the case of an indirect output, the relevant vehicle function processing sequences 2 are first transmitted to another controller (not shown), which controls or regulates the actual execution of the vehicle functions by outputting the control signals 5a, 5b, 5c, e.g. by outputting the control signals 5a, 5b, 5c to the vehicle function devices 6a, 6b, 6c, evaluating feedback signals from the vehicle function devices 6a, 6b, 6c and continuing or aborting the processing of the vehicle function processing sequences 2 according to the evaluation.

Optionally, the controller 13 can adapt the extent to which the provided vehicle function processing sequence 2 is to be executed, e.g. to the detected and evaluated current situation of the vehicle 1. This means, for example, that not all vehicle functions are automatically activated or deactivated or additional vehicle functions are activated or deactivated by generating appropriate control signals 5a, 5b, 5c and outputting them to the vehicle function devices 6a, 6b, 6c. This means that the controller 13 decides whether the vehicle function processing sequence is to be applied completely, partially, or not at all.

The system 200 enables a reduction of the number of actions that must be performed by the driver of the vehicle 1 to activate one of the vehicle function processing sequences 2. It prevents the unwanted activation of a vehicle function processing sequence 2 by detecting and evaluating the respective situation more accurately, namely based on V2I communication and/or determining the positioning of the vehicle 1 using a global navigation satellite system 18. It also allows the adaptation of vehicle function processing sequences 2 based on the respective situation.

For example, based on a specific example, the system 200 can use the following data and information: position 19 of the vehicle 1 with respect to the communication-enabled infrastructure device 4, type and state of the communication-enabled infrastructure device 4, e.g. light phase of the traffic light system, status of a railway crossing, etc. as well as values of vehicle-related parameters 7, such as acceleration, steering wheel angle, speed, etc. This data and information is used to determine whether the vehicle 1 is stopping due to a traffic light system showing red or changing to red, at a railway crossing, or in order to park.

For example, the braking of the vehicle 1 at a red light signal or a signal changing to red without a steering wheel movement can indicate that the vehicle 1 is stopping in front of a red traffic light signal while driving straight ahead in a specific lane, the traffic light of which is showing red or changing to red or which is blocked by a closed railway barrier.

Viewed from the other side: if there is no traffic light system, no stop sign and no railway crossing near the vehicle 1 and the motion pattern of the steering wheel indicates pulling over to the roadside, this may indicate a parking situation and the vehicle function processing sequence 2 "Parking automation" should be executed.

If, for example, a vehicle position is detected near the driver's residential garage or in a company parking lot, the parking automation should certainly be implemented. However, certain functions such as activating the hazard warning lights or keeping the infotainment system on standby, which are provided in the parking automation system in relation to any parking facility, can be omitted, for example, in order to conserve the battery charge, increase the service life of the hazard warning lights, and save at least one additional action by the driver.

Figure 2:
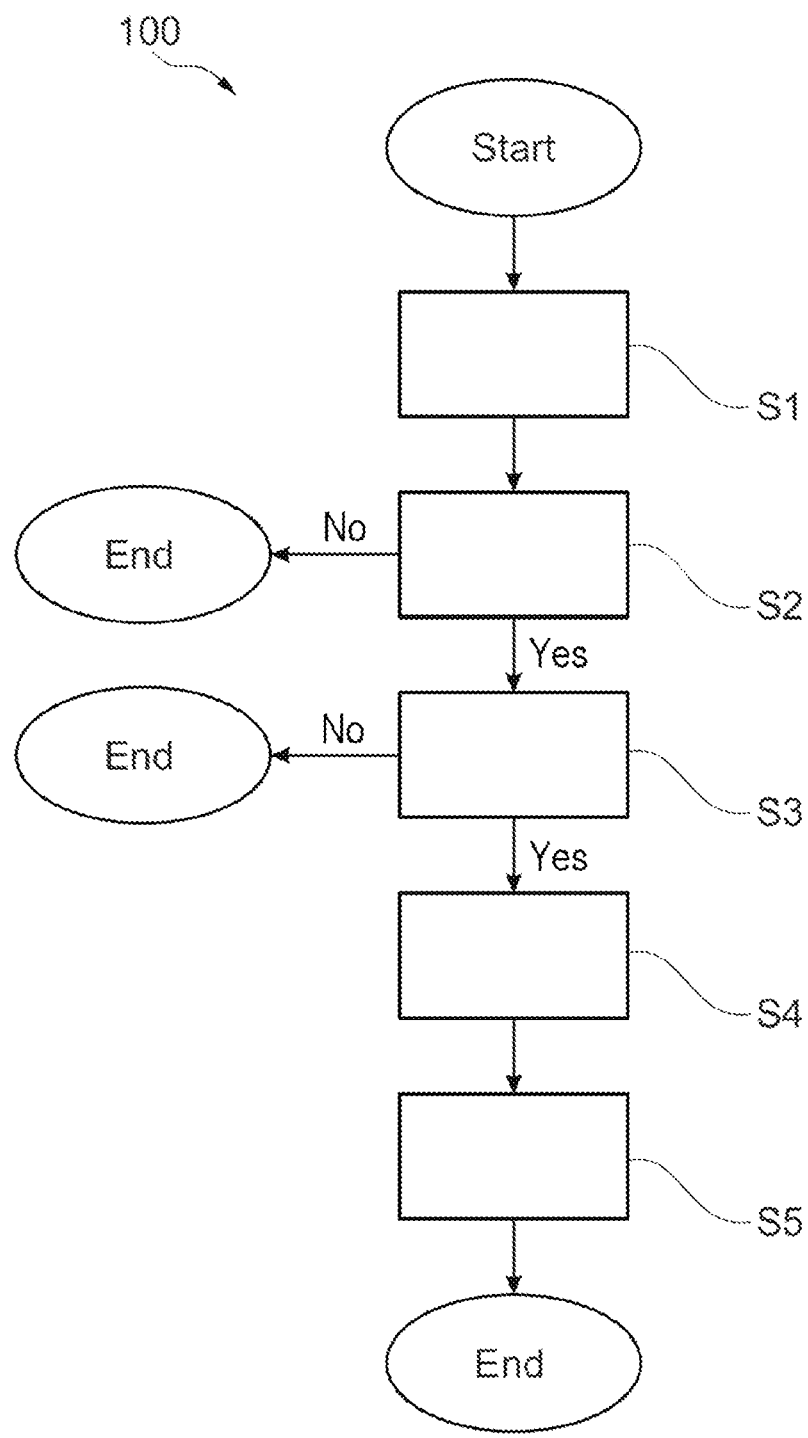
FIG. 2 shows a flow diagram of an example method.

FIG. 2 shows an example flow diagram 100 for the automated execution of vehicle functions of a vehicle 1, which can be executed, for example, with the system 200 described in reference to FIG. 1. After the start, in step S1 one or more vehicle function processing sequences 2 are provided, e.g., retrieved from a memory 8. The vehicle function processing sequences 2 define a sequence of vehicle functions on the occurrence of multiple triggering events 3a, 3b, 3c, wherein at least the first triggering event 3a is based on a communication from a communication-enabled infrastructure device 4.

In step S2, it is checked whether the first triggering event 3a has occurred. If this is not the case, the method 100 is terminated. If the first triggering event 3a has occurred, the method 100 continues to step S3. In step S3, it is checked whether the additional triggering events 3b and 3c, provided depending on the vehicle function processing sequence 2, are also present. If this is not the case, the method 100 is terminated. If the other triggering events 3b, 3c have occurred, the method continues to step S4.

In step S4, control signals 5a, 5b, 5c are generated which control vehicle function devices 6a, 6b, 6c according to the vehicle function processing sequence 2.

In step S5, these control signals 5a, 5b, 5c are output to the vehicle function devices 6a, 6b, 6c so that the vehicle functions are executed.

Figure 3:
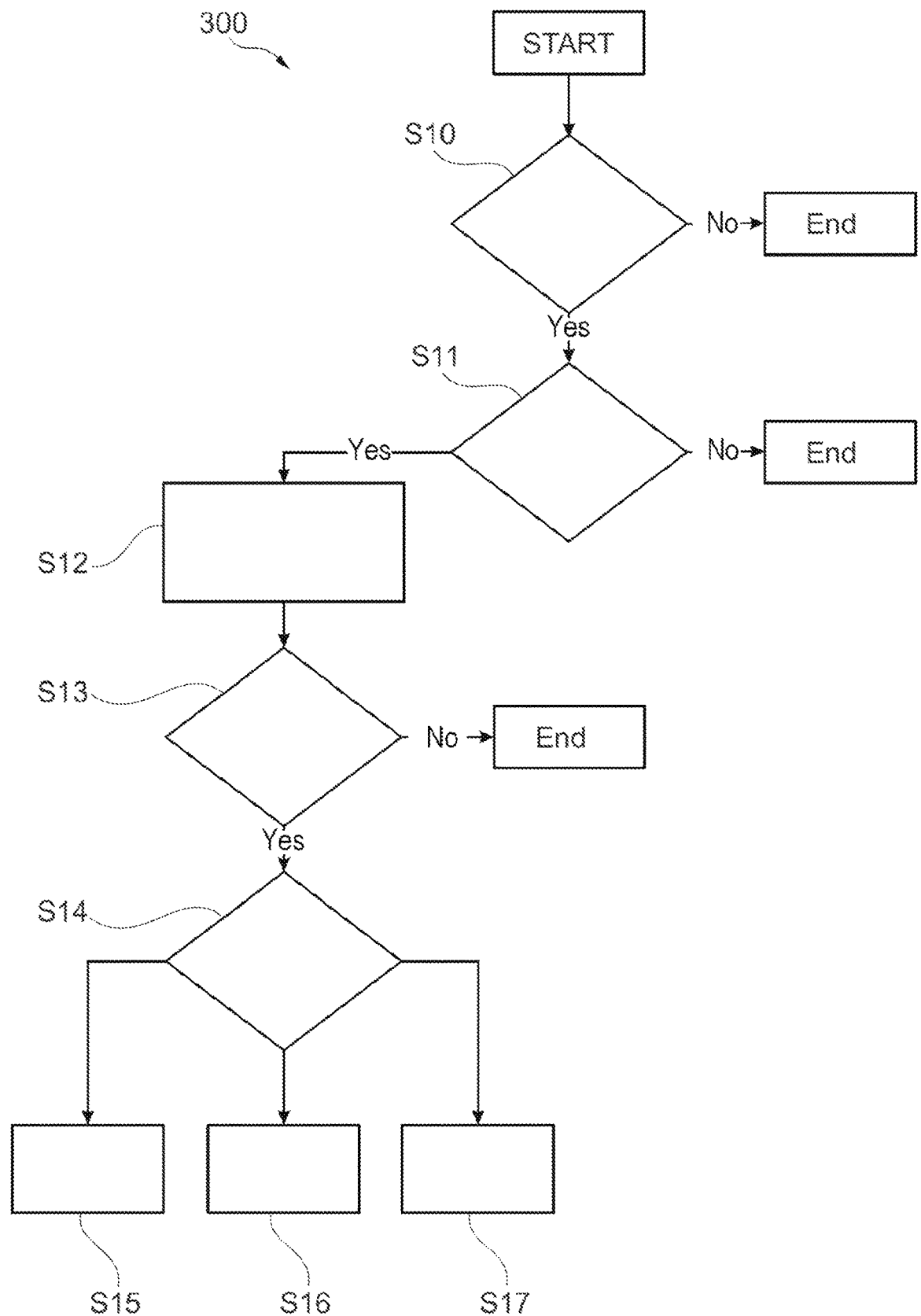
FIG. 3 shows a flow diagram of a further example method.

FIG. 3 shows a flow diagram of another example method 300. After the start, in step S10, it is checked whether a vehicle function processing sequence 2 is available or has been provided. If this is not the case, the method 300 is terminated. If a vehicle function processing sequence 2 is present, the method 300 continues to step S11.

In step S11, it is checked whether automation of vehicle functions is always activated. If this is not the case, the method 300 is terminated. If automation of vehicle functions is always activated, the method 300 continues to step S12.

In step S12 the current situation of the vehicle 1 is checked, based on V2I communication, position determination signals 16 of a global navigation satellite system 18, and sensor signals 14 of sensors 12 of the vehicle 1.

In step S13, it is then checked whether the required triggering events 3a, 3b, 3c have occurred. If this is not the case, the method 300 is terminated. If the required triggering events 3a, 3b, 3c have occurred, the method 300 continues to step S14.

In step S14, the situation of the vehicle 1 is analyzed in more detail. According to this analysis, the vehicle function processing sequence 2 is not activated at all (S15), partially (S16), or completely (S17), i.e., the vehicle functions defined in the vehicle function processing sequence 2 are executed not at all, partially, or completely automatically.

LIST OF REFERENCE SIGNS

1 vehicle
2 vehicle function processing sequence
3a first triggering event
3b, 3c additional triggering event
4 communication-enabled infrastructure device
5a, 5b, 5c control signal
6a, 6b, 6c vehicle function device
7 vehicle-related parameter
8 memory
9 communication unit
10 position determination unit
11 input unit
12 sensor
13 controller
14 sensor signal
15 infrastructure signal
16 position determination signal
17 input signal
18 global navigation satellite system
19 position
100 method 200 system
300 method
S1 to S5 method steps of a first method
S10 to S17 method steps of a further method

The invention claimed is:

1. A method, comprising:
providing a vehicle function processing sequence, which specifies a processing sequence of vehicle functions based upon an occurrence of a first triggering event and at least one further triggering event, wherein the first triggering event is based on communication from a communication-enabled infrastructure device;
checking for the occurrence of the first triggering event and the at least one further triggering event, wherein one of the triggering events is a position of the vehicle in a specifiable distance range to the communication-enabled infrastructure device and wherein checking for the occurrence of this triggering event comprises determining a position of the vehicle with respect to the communication-enabled infrastructure device, wherein the position of the vehicle with respect to the communication-enabled infrastructure device is determined by means of a global navigation satellite system and/or by means of direct communication between the vehicle and the communication-enabled infrastructure device;
upon the occurrence of the first triggering event, and the at least one further triggering event, generating control signals for controlling vehicle function devices in accordance with the vehicle function processing sequence; and
outputting the generated control signals to the vehicle function devices for executing the vehicle functions.

2. The method of claim 1, wherein the communication-enabled infrastructure device is selected from a group comprising a set of traffic lights, a traffic sign, a railway crossing, a vehicle charging station, and a vehicle parking facility.

3. The method of claim 1, wherein one of the triggering events is a specifiable state of the communication-enabled infrastructure device.

4. The method of claim 3, wherein checking for the occurrence of the specifiable state of the communication-enabled infrastructure device as a triggering event is based on a communication from the communication-enabled infrastructure device.

5. The method of claim 1, wherein one of the triggering events is a value of a vehicle-related parameter in a specifiable value range.

6. The method of claim 5, wherein the vehicle-related parameter is selected from a group comprising acceleration, speed, steering wheel angle change, and gear shift position.

7. The method of claim 1, wherein control signals are generated to different extents depending on the occurrence of one or more triggering events.

8. A system including a processor and a memory, wherein the memory stores instructions executable by the processor such that the processor is programmed to:
provide a vehicle function processing sequence, which specifies a processing sequence of vehicle functions based upon an occurrence of a first triggering event and at least one further triggering event, wherein the first triggering event is based on communication from a communication-enabled infrastructure device;
check for the occurrence of the first triggering event and the at least one further triggering event, wherein one of the triggering events is a position of the vehicle in a specifiable distance range to the communication-enabled infrastructure device and wherein checking for the occurrence of this triggering event comprises determining a position of the vehicle with respect to the communication-enabled infrastructure device, wherein the position of the vehicle with respect to the communication-enabled infrastructure device is determined by means of a global navigation satellite system and/or by means of direct communication between the vehicle and the communication-enabled infrastructure device;
upon the occurrence of the first triggering event, and the at least one further triggering event, generate control signals for controlling vehicle function devices in accordance with the vehicle function processing sequence; and
output the generated control signals to the vehicle function devices for executing the vehicle functions.

9. The system of claim 8, wherein the communication-enabled infrastructure device is selected from a group comprising a set of traffic lights, a traffic sign, a railway crossing, a vehicle charging station, and a vehicle parking facility.

10. The system of claim 8, wherein one of the triggering events is a specifiable state of the communication-enabled infrastructure device.

11. The system of claim 10, wherein the instructions to check for the occurrence of the specifiable state of the communication-enabled infrastructure device as a triggering event is based on a communication from the communication-enabled infrastructure device.

12. The system of claim 11, wherein one of the triggering events is a value of a vehicle-related parameter in a specifiable value range.

13. The system of claim 12, wherein the vehicle-related parameter is selected from a group comprising acceleration, speed, steering wheel angle change, and gear shift position.

14. The system of claim 13, wherein control signals are generated to different extents depending on the occurrence of one or more triggering events.

* * * * *